(12) United States Patent
Dupont de Dinechin et al.

(10) Patent No.: US 12,321,473 B2
(45) Date of Patent: Jun. 3, 2025

(54) ON-DEMAND ENCRYPTED CONTAINER IMAGE DOWNLOAD

(71) Applicant: Red Hat, Inc., Raleigh, NC (US)

(72) Inventors: Christophe Marie Francois Dupont de Dinechin, Puteaux (FR); Alasdair Graeme Kergon, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 208 days.

(21) Appl. No.: 18/320,379

(22) Filed: May 19, 2023

(65) Prior Publication Data

US 2024/0386115 A1    Nov. 21, 2024

(51) Int. Cl.
    *G06F 21/62*      (2013.01)
    *G06F 21/53*      (2013.01)

(52) U.S. Cl.
    CPC .......... *G06F 21/6209* (2013.01); *G06F 21/53* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 10,733,306 B2 | 8/2020 | Lum et al. | |
| 11,055,428 B1 | 6/2021 | Clerget et al. | |
| 11,475,138 B2 | 10/2022 | Bacher et al. | |
| 11,489,820 B2 | 11/2022 | Bouaziz | |
| 2019/0213319 A1 | 7/2019 | Gerebe et al. | |
| 2020/0250319 A1 | 8/2020 | Bacher et al. | |
| 2022/0222100 A1 | 7/2022 | Srivastava et al. | |
| 2022/0391494 A1 | 12/2022 | Yang et al. | |

FOREIGN PATENT DOCUMENTS

CN      109190386 A      1/2019

OTHER PUBLICATIONS

Extended European Search Report for European Patent Application No. 23203638.4, dated Apr. 24, 2024, 5 pages.

*Primary Examiner* — Boris D Grijalva Lobos
(74) *Attorney, Agent, or Firm* — Dority & Manning, P.A.

(57) ABSTRACT

A virtual machine (VM)-based container runtime executing on a computing device receives a request to run a container from a container image that is at least partially encrypted. The VM-based container runtime causes a VM to be initiated from a VM image, the VM image including an agent operable to, during execution, obtain a plurality of decryption keys operable to decrypt blocks of the container image. The agent is operable to set up a block remapper in the VM to be invoked by a file system mounted to the VM to request a particular container image block, send a request for the particular container image block to a block obtainer component executing outside of the VM, utilize a decryption key to decrypt a container image block received from the block obtainer component to generate a decrypted container image block, and pass the decrypted container image block to the file system.

20 Claims, 13 Drawing Sheets

| FIG. 2A1 | FIG. 2A2 |
|---|---|
| FIG. 2B1 | FIG. 2B2 |

*FIG. 2*

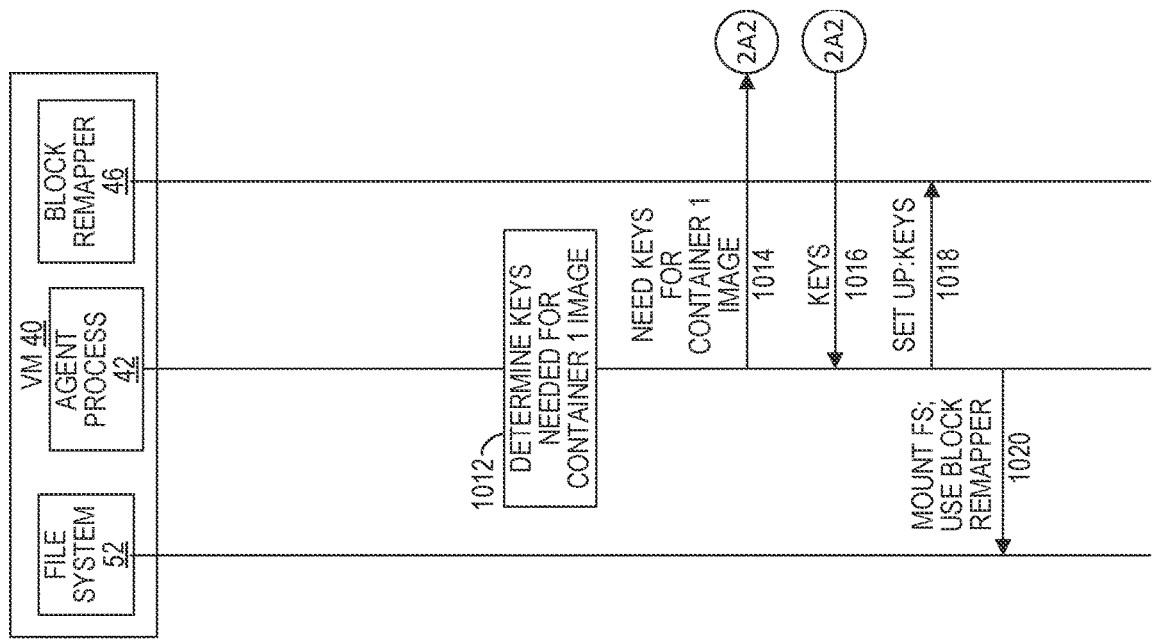
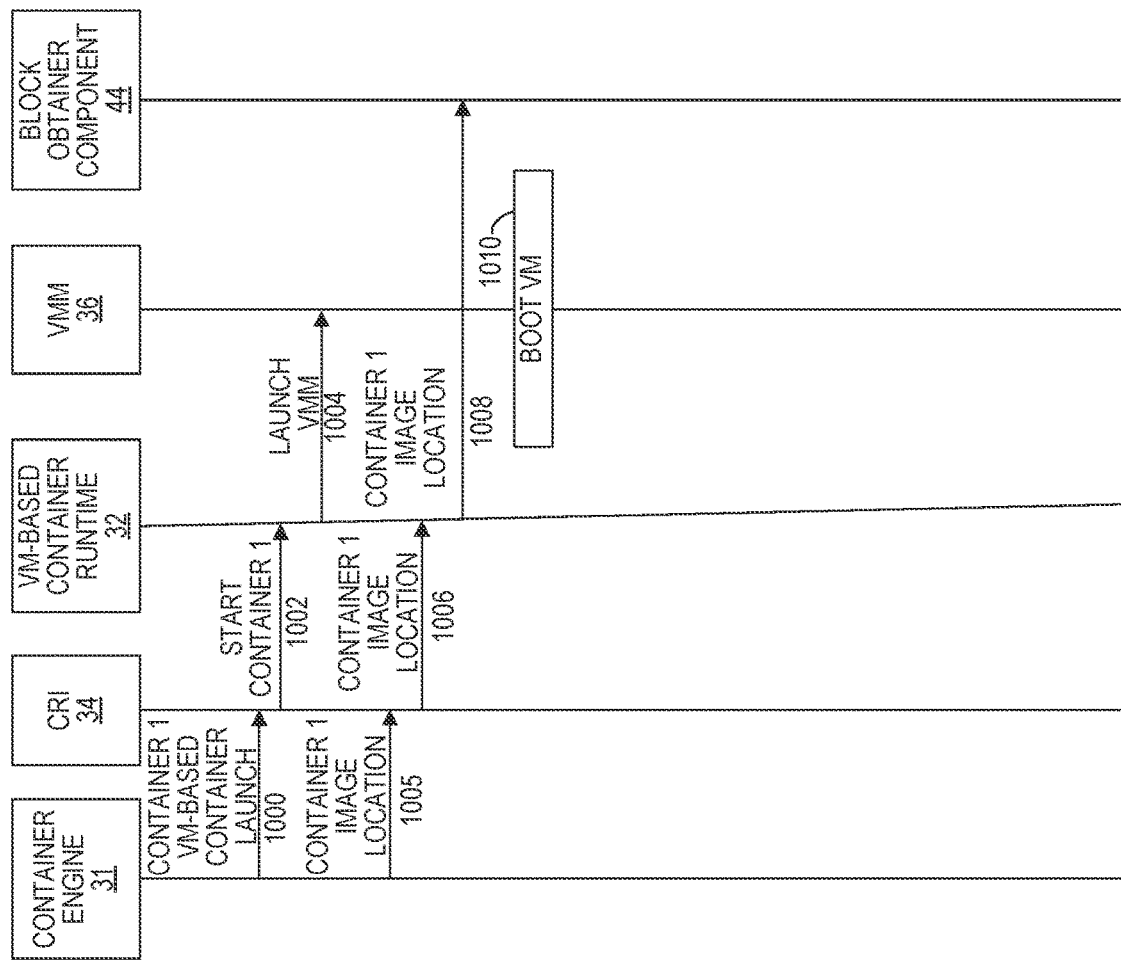
FIG. 2A1

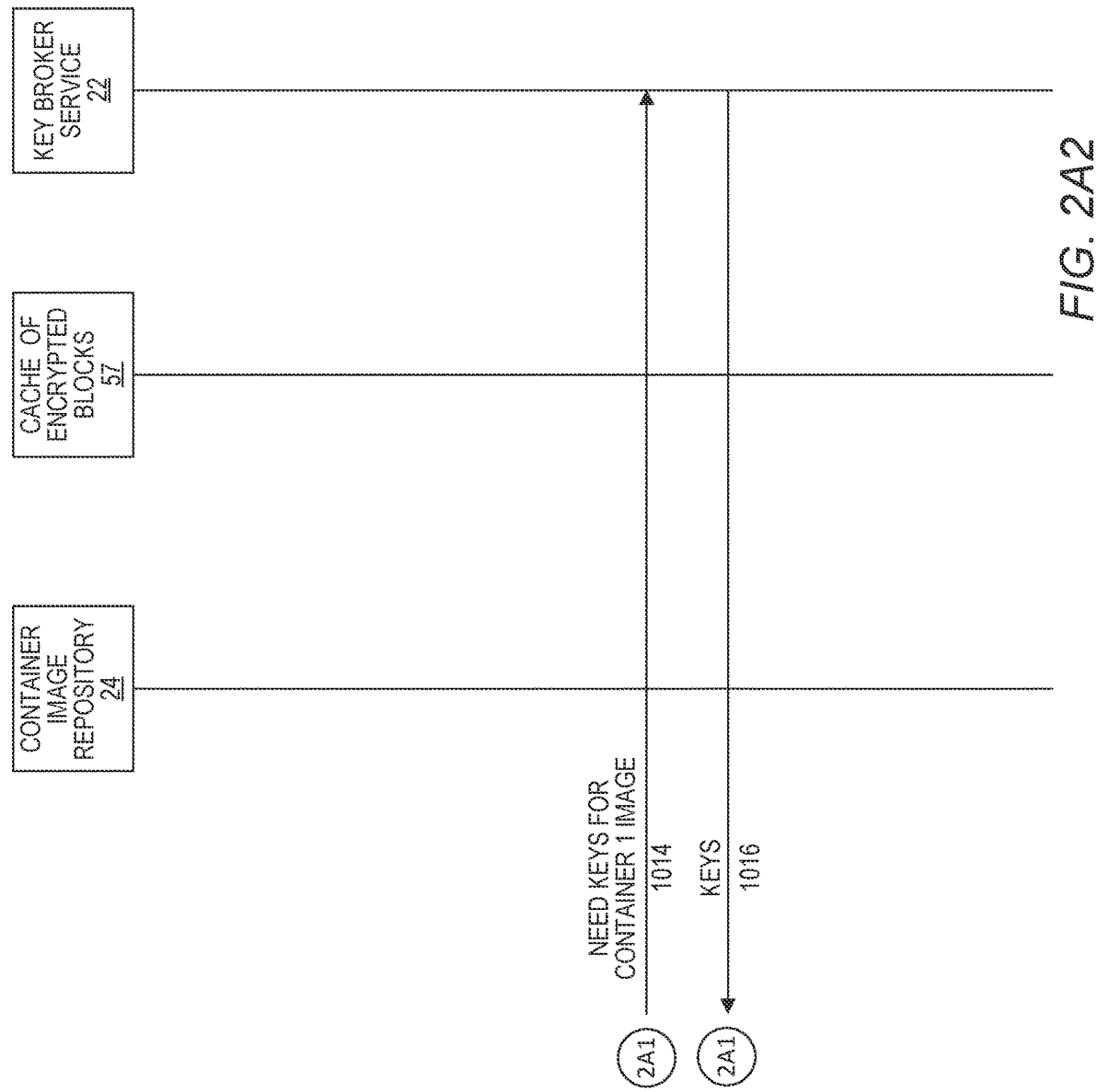
FIG. 2A2

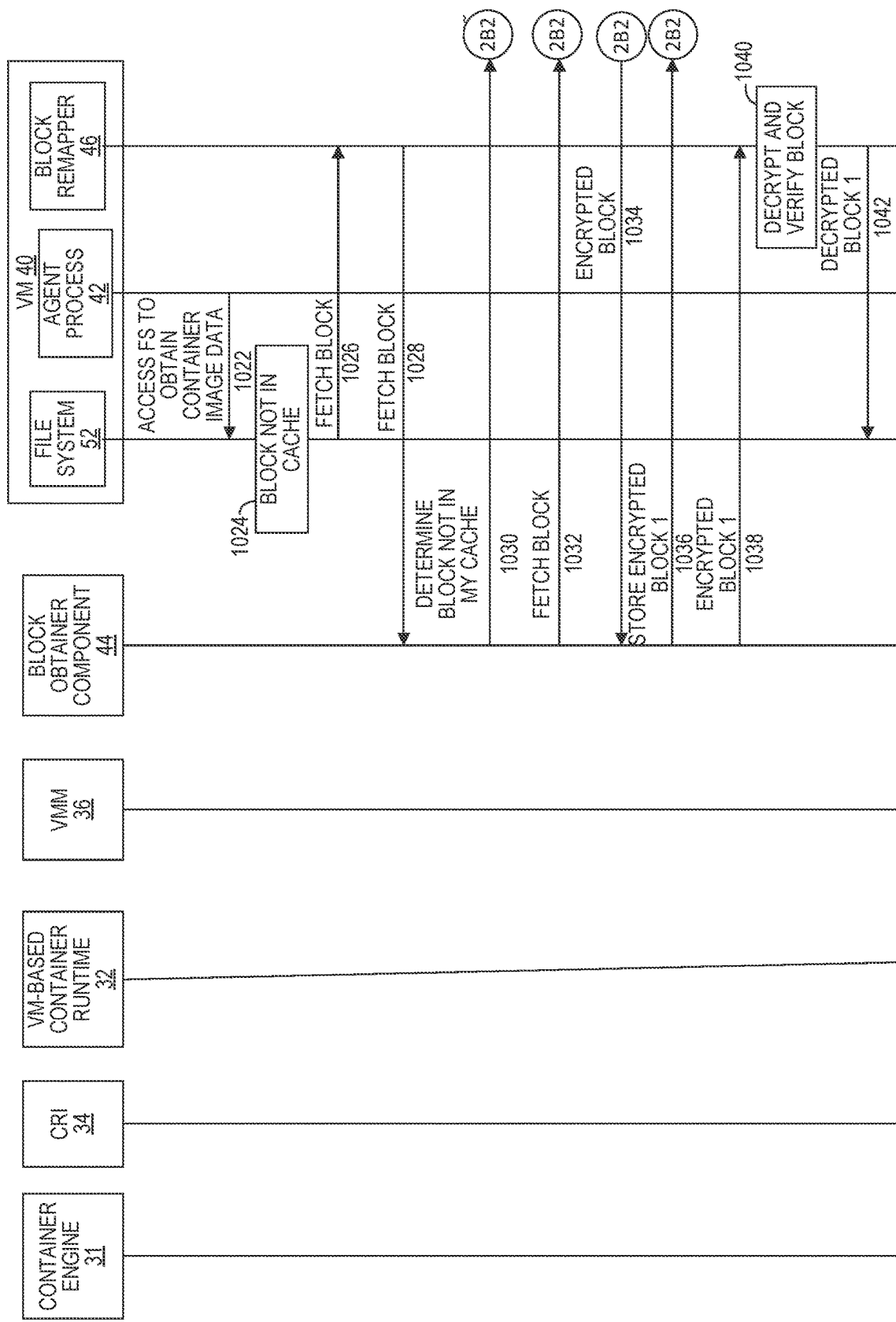
FIG. 2B1

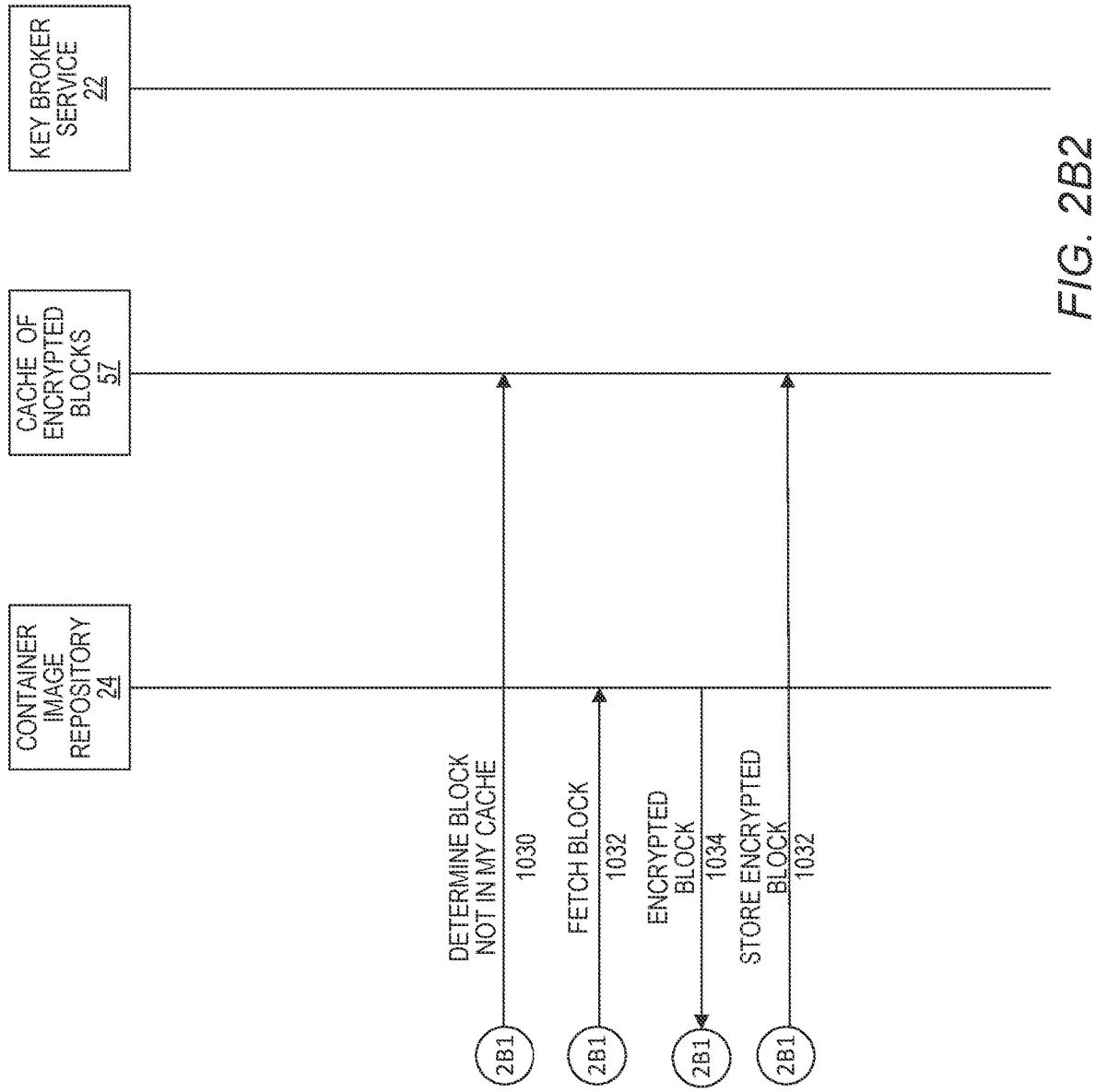
FIG. 2B2

ON-DEMAND ENCRYPTED CONTAINER IMAGE DOWNLOAD

BACKGROUND

Although containerization technologies provide strong isolation between containers running in different namespaces, there are times when it is desirable to implement even stronger security for a container using the isolation inherent in a virtual machine.

SUMMARY

The examples disclosed herein implement on-demand encrypted container image download for VM-based containers.

In one example a method is provided. The method includes receiving, by a virtual machine (VM)-based container runtime executing on a computing device, a first request to run a first container from a container image that is at least partially encrypted. The method further includes causing, by the VM-based container runtime, a first VM to be initiated from a VM image, the VM image including an agent operable to, during execution, obtain a plurality of decryption keys operable to decrypt blocks of the container image, and operable to set up a first block remapper in the first VM to be invoked by a file system mounted to the first VM to request a particular container image block, send a request for the particular container image block to a block obtainer component executing outside of the first VM, utilize a decryption key to decrypt a container image block received from the block obtainer component to generate a decrypted container image block, and pass the decrypted container image block to the file system.

In another example a computing device is provided. The computing device includes a memory, and a processor device coupled to the memory to receive, by a virtual machine (VM)-based container runtime, a first request to run a first container from a container image that is at least partially encrypted. The processor device is further to cause, by the VM-based container runtime, a first VM to be initiated from a VM image, the VM image including an agent operable to, during execution, obtain a plurality of decryption keys operable to decrypt blocks of the container image, and operable to set up a first block remapper in the first VM to be invoked by a file system mounted to the first VM to request a particular container image block, send a request for the particular container image block to a block obtainer component executing outside of the first VM, utilize a decryption key to decrypt a container image block received from the block obtainer component to generate a decrypted container image block, and pass the decrypted container image block to the file system. The processor device is further to send, by the VM-based container runtime to the block obtainer component, location information that identifies a location of the container image.

In another example a non-transitory computer-readable storage medium is provided. The non-transitory computer-readable storage medium includes executable instructions to cause a processor device to receive, by a virtual machine (VM)-based container runtime, a first request to run a first container from a container image that is at least partially encrypted. The instructions further cause the processor device to cause, by the VM-based container runtime, a first VM to be initiated from a VM image, the VM image including an agent operable to, during execution, obtain a plurality of decryption keys operable to decrypt blocks of the container image, and operable to set up a first block remapper in the first VM to be invoked by a file system mounted to the first VM to request a particular container image block, send a request for the particular container image block to a block obtainer component executing outside of the first VM, utilize a decryption key to decrypt a container image block received from the block obtainer component to generate a decrypted container image block, and pass the decrypted container image block to the file system.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 2 is a block diagram illustrating the relationship of FIGS. 2A1-2B2;

FIGS. 2A1-2B2 are a message sequence diagram illustrating messages communicated between and actions taken by various components illustrated in FIG. 1 when implementing on-demand encrypted container image download for VM-based containers according to one implementation;

DETAILED DESCRIPTION

Figure 1:
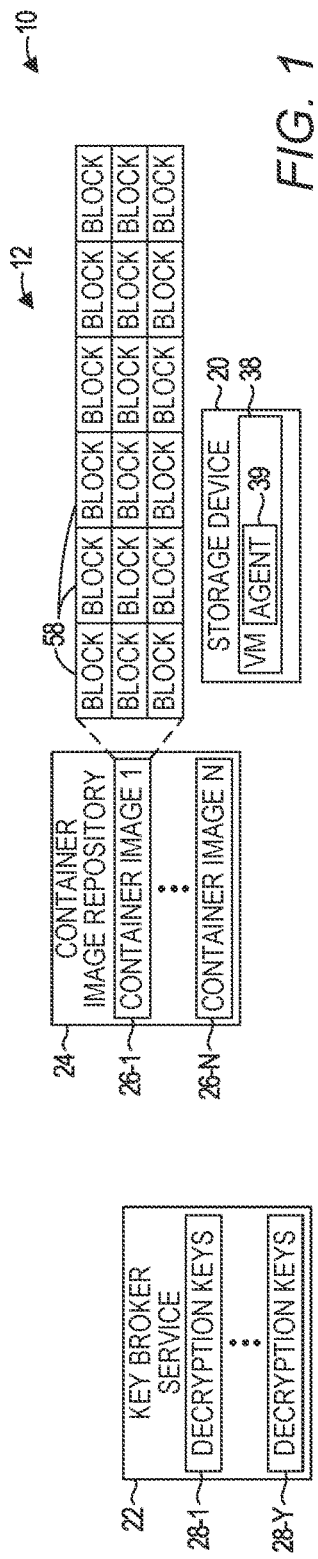
FIG. 1 is a block diagram of an environment in which on-demand encrypted container image download for VM-based containers can be practiced according to some implementations.
Figure 1:
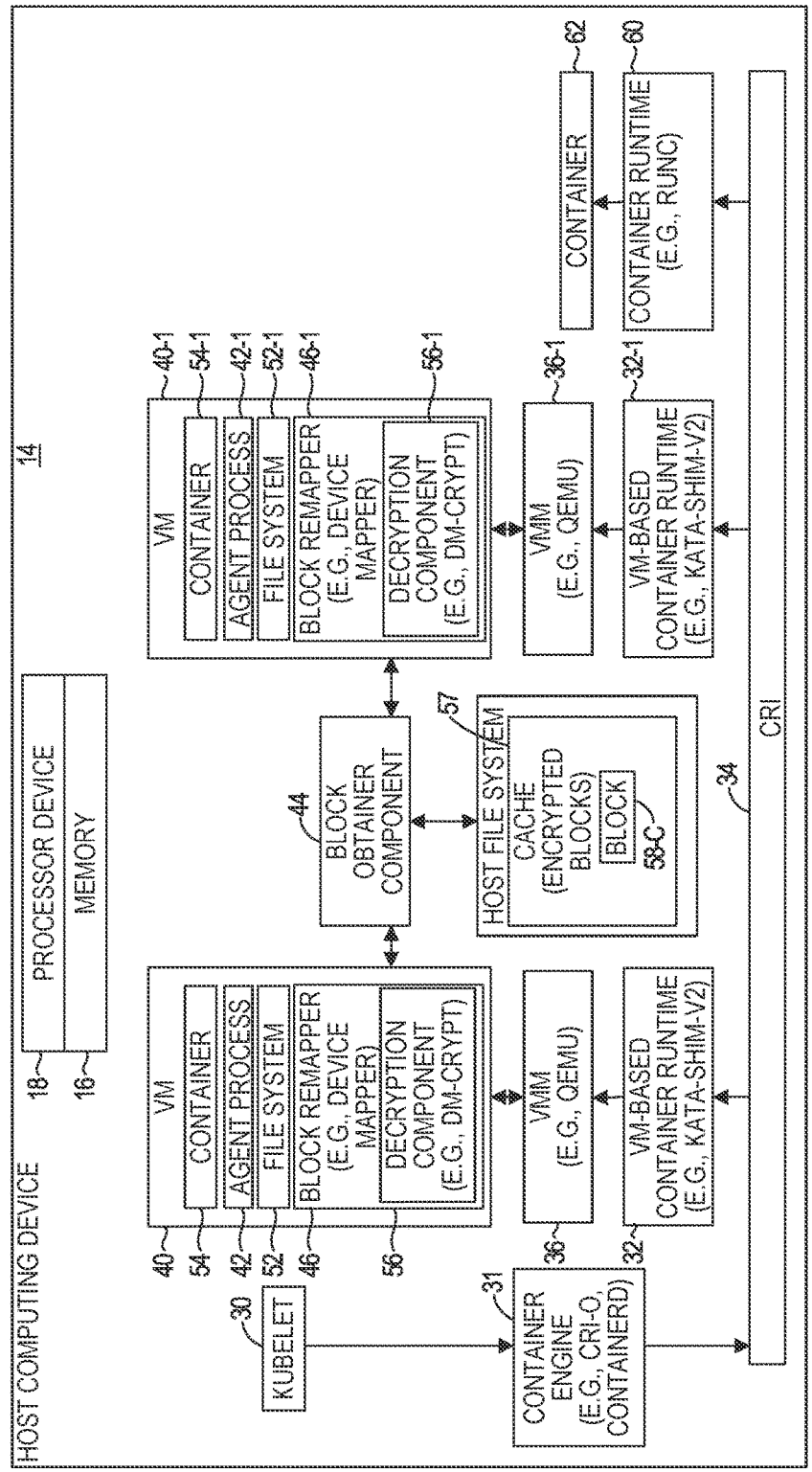

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

The phrase "container" as used herein refers to a running process that is isolated from other processes via namespaces and cgroups. A container is executed (e.g., initiated or instantiated) from a container image. A container image is a static package of software comprising one or more layers, the layers including everything needed to run an application (i.e., as a container) that corresponds to the container image, including, for example, one or more of executable runtime code, system tools, system libraries and configuration settings. A Docker® image is an example of a container image. A container image typically includes one or more file directories that include all executables, other than the host operating system kernel, necessary for the container to run.

The life-cycle of a container is managed by a container engine, such as, by way of non-limiting example, Docker, Windows Containers, and the like. The execution of a container is delegated by the container engine to a container runtime, such as runc, crun, or kata. Notably, for container images that have common (e.g., identical) layers, the container engine need only pull down (e.g., download) the container image layer from a container image repository once. Subsequent containers initiated from container images that include the same container image layer utilize the same copy of the container image layer. This greatly reduces initiation time of subsequent containers that utilize the same container image layer where the container image layer is substantial in size because there is no download delay, and reduces storage requirements since there is only one copy of the container image layer irrespective of whether tens or hundreds of executing containers all use the same container image layer.

Despite the strong isolation characteristics of containers, there are certain types of containers, such as highly sensitive containers, which require even more isolation than possible through containerization technologies. This may even require encrypted container images. Mechanisms to limit the runtime cost of this container image encryption is desirable.

To address this need, virtual machine (VM)-based container runtimes (sometimes referred to as a type of "sandboxed" container), such as, by way of non-limiting example, Kata containers, execute each container in its own VM. A VM-based container has its own operating system (OS) kernel and, thus, is protected from the host OS kernel. Initiating a VM-based container incurs substantially more overhead than a conventional container due to the increased resource usage of a VM.

The container image is typically pulled from a container repository by the container engine and stored in non-transitory storage. For confidentiality reasons, it may be desirable to prevent the container engine from accessing the container image by encrypting it and delegating the download operation to the VM. The container image is pulled from a container repository from within the VM, eliminating the ability to share common container image layers among different containers. Thus, each VM-based container must download the entire container image.

The examples disclosed herein implement on-demand encrypted container image download for VM-based containers. In particular, the examples download container image blocks on-demand rather than downloading the complete container image as is conventionally done. Moreover, the examples implement a host-based block caching mechanism that maintains a cache of encrypted container image blocks that can be shared among any number of VM-based containers. Among other advantages, the examples implement confidential containers that initiate from encrypted container images wherein the encrypted container images are decrypted inside the VM, ensuring that the container image cannot be accessed by other processes, while enabling sharing of the encrypted container images layers among any number of VM-based containers that utilize the same layer with the same encryption. Moreover, the examples implement faster container initiation because the file storage blocks in which the container image is stored are downloaded on-demand, eliminating the delay that otherwise occurs when a complete container image is downloaded.

FIG. 1 is a block diagram of an environment 10 in which on-demand encrypted container image download for VM-based containers can be practiced according to some implementations. The environment 10 includes a system 12 that includes one or more computing devices 14, each of which includes a memory 16 and one or more processor devices 18. The computing device 14 is in communication with a storage device 20, a key broker service 22, which may run on the computing device 14 or on another computing device, and a container image repository 24, which may also run on the computing device 14 or on another computing device. The container image repository 24 contains a plurality of container images 26-1-26-N (generally, container images 26), each of which comprises a plurality of container image layers that are generated during a container image build process by a container image build engine, such as, by way of non-limiting example, the Docker® container image build engine.

A container image 26 may not be encrypted, may be completely encrypted, or may be partially encrypted. In some examples, after a container image has been built, the blocks of the container image can be encrypted with corresponding ones of a plurality of encryption keys, and the decryption keys can be stored in the key broker service 22. The key broker service 22 maintains sets of decryption keys 28-1-28-Y, each of which corresponds to a specific container image 26.

In this example, the computing device 14 is a worker node of a Kubernetes-based container orchestration system, such as, by way of non-limiting example, OpenShift®; however, the examples disclosed herein are not limited to container orchestration environments. A Kubernetes control plane component executing on the computing device 14, a Kubelet 30, receives an instruction from another Kubernetes control plane component, such as a scheduler (not illustrated) to initiate a VM-based container on the computing device 14 from the container image 26-1. The Kubelet 30 sends an instruction to a container engine 31 such as, by way of non-limiting example, containerd or CRI-O. The container engine 31 sends an instruction to a VM-based container runtime 32 via a channel, such as a container runtime interface (CRI) 34. In this example, the container engine 31 instructs the VM-based container runtime 32, via the CRI 34, to initiate the VM-based container on the computing device 14 from the container image 26-1. In some implementations, the VM-based container runtime 32 may comprise a modified version of a Kata container VM-based container runtime available at katacontainers.io/.

The VM-based container runtime 32 initiates a virtual machine monitor (VMM) 36, such as, by way of non-limiting example, a modified version of QEMU available at gitlab.com/qemu-project/qemu. The VMM 36 accesses a VM image 38 that includes an agent 39. The VMM 36 boots a VM 40 from the VM image 38, and the agent 39 initiates as an agent process 42 executing in the VM 40. The VM-based container runtime 32 also sends container image location information that identifies a location of the container image 26-1 to a block obtainer component 44, which runs external to the VM 40.

In this example, the container image 26-1 is completely encrypted, and the decryption keys 28-1 can be used to decrypt blocks of the container image 26-1. The agent process 42 initiates and obtains the decryption keys 28-1 from the key broker service 22. In one implementation, the agent process 42 may have been passed decryption key information that identifies the decryption keys 28-1 during the boot process of the VM 40. For example, the container engine 31 may provide the identity of the decryption keys 28-1 to the VM-based container runtime 32, which in turn provides them to the VMM 36, which passes them into the VM 40 via any suitable means, such as environment variables, storing them in a predetermined location of the VM 40, or the like. In another implementation, upon initiation, the agent process 42 initiates an attestation process, such as that described in www.ietf.org/archive/id/draft-ietf-rats-architecture-22.html, with an attestation agent of the key broker service 22, to verify that the VM 40 is not malicious or otherwise corrupted. If the attestation process determines that the VM 40 is valid, the key broker service 22 provides the decryption keys 28-1 to the agent process 42.

The agent process 42 sets up a block remapper 46 that will remap requests made to a filesystem from processes executing in the VM 40 to block storage requests directed to the block obtainer component 44. In one implementation, the block remapper 46 comprises the Linux kernel device mapper. The setup of the block remapper 46 includes providing the block remapper 46 with the decryption keys 28-1, or a reference to the decryption keys 28-1. In some examples, the block remapper 46 includes a separate decryption component 56 that is operable to decrypt the encrypted blocks of the container image 26-1 using the decryption keys 28-1. In some implementations, the decryption component 56 may comprise dm-crypt which is a transparent block device encryption/decryption subsystem in the Linux kernel.

The agent process 42 mounts a file system 52 to the VM 40 and configures the file system 52 to invoke the block remapper 46 to obtain blocks of the container image 26-1. The agent process 42 then causes an initiation of the container 54 from the container image 26-1, which in turn causes the file system 52 to be accessed to retrieve a block 58 of the container image 26-1. The file system 52 requests the block 58 from the block remapper 46. The block remapper 46 sends a request for the block 58 to the block obtainer component 44. The block obtainer component 44 accesses a cache 57 and determines that the block 58 has not previously been requested. The block obtainer component 44 retrieves the requested block 58 from the container image repository 24 and stores a copy of the block 58-C in the cache 57. The block 58 and the block 58-C are encrypted. The cache 57 is part of the host file system of the computing device 14 that is separate from the file system 52 of the VM 40. Note that the block obtainer component 44 does not have the decryption keys 28-1 and thus cannot decrypt the block 58 or 58-C.

The block obtainer component 44 sends the block 58 to the block remapper 46. The decryption component 56 decrypts the block 58 using the appropriate decryption key 28. The block remapper 46 provides the decrypted container image block 58 to the file system 52. The file system 52 provides the decrypted container image block to the process initiating the container 54. This process repeats for each block 58 needed by the file system 52 based on requests made to the file system 52 by processes executing in the VM 40.

Subsequently, while the VM 40 is still executing, the container engine 31 receives another instruction from the scheduler to initiate another VM-based container on the computing device 14 from the container image 26-1. The container engine 31 sends an instruction to a VM-based container runtime 32-1 via the CRI 34 instructing the VM-based container runtime 32-1 to initiate the VM-based container on the computing device 14 from the container image 26-1.

The VM-based container runtime 32-1 initiates a VMM 36-1. The VMM 36-1 accesses the VM image 38 and boots a VM 40-1 from the VM image 38. As part of the initiation of the VM 40-1, an agent process 42-1 initiates. The VM-based container runtime 32-1 also sends container image location information that identifies the location of the container image 26-1 to the block obtainer component 44.

The agent process 42-1 initiates, and obtains the decryption keys 28-1 from the key broker service 22. The agent process 42-1 sets up a block remapper 46-1 that will remap requests to a filesystem from processes executing in the VM 40-1 to block storage requests directed to the block obtainer component 44. Again, in this example, the block remapper 46-1 includes a separate decryption component 56-1 that is operable to decrypt the encrypted blocks of the container image 26-1 using the decryption keys 28-1. In some implementations, the decryption component 56-1 may comprise dm-crypt.

The agent process 42-1 mounts a filesystem 52-1 to the VM 40-1 and configures the filesystem 52-1 to invoke the block remapper 46-1 to obtain blocks of the container image 26-1. The agent process 42 then causes an initiation of the container 54-1 from the container image 26-1, which in turn causes the file system 52-1 to be accessed to retrieve a block 58 of the container image 26-1. The file system 52-1 requests the block 58 from the block remapper 46-1. The block remapper 46-1 sends a request for the block 58 to the block obtainer component 44. The block obtainer component 44 accesses the cache 57 and determines that the requested block 58 is the same block as the block 58-C in the cache 57 and thus the block obtainer component 44 need not download the requested block 58 from the container image repository 24. The block obtainer component 44 sends the encrypted block 58-C to the block remapper 46-1. The decryption component 56-1 decrypts the block 58-C using the appropriate decryption key. The block remapper 46-1 provides the decrypted container image block 58-C to the file system 52-1. The file system 52-1 provides the decrypted container image block to the process initiating the container 54-1.

In this manner the container image 26-1 is downloaded on-demand, incrementally, block by block, rather than all at once, reducing the startup times of the containers 54 and 54-1. Moreover, the encrypted blocks 58 of the container image 26-1 can be cached and shared among multiple VM-based containers while remaining encrypted outside of the VMs 40 and 40-1, greatly reducing the storage that would otherwise be required to maintain separate copies of each block of the container image 26-1 for each VM-based container that is initiated from the container image 26-1, as well as eliminating downloading time from the container image repository 24 for each block that was previously downloaded.

The container engine 31 receives another instruction from the Kubernetes control plane component, such as a scheduler (not illustrated) to initiate a non-VM-based container on the computing device 14 from container image 26-N, which is not encrypted. The container engine 31 sends an instruction to a non-VM-based container runtime 60 (hereinafter "container runtime 60" for purposes of brevity), such as, by way of non-limiting example, RUNC, via the CRI 34 instructing the VM-based container runtime 32 to initiate the container on the computing device 14 from the container image 26-N. The VM-based container runtime 32 initiates a container 62 on the computing device 14.

Figures 2, 2A, 2B:
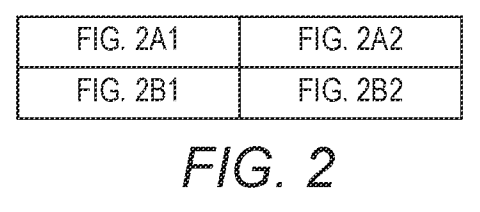

FIG. 2 is a block diagram illustrating the relationship of FIGS. 2A1-2B2.

FIGS. 2A1-2B2 are a message sequence diagram illustrating messages communicated between and actions taken by various components illustrated in FIG. 1 when implementing on-demand encrypted container image download for VM-based containers according to one implementation. The container engine 31 instructs, via the CRI 34, the VM-based container runtime 32 to launch a container (steps 1000, 1002). For purposes of illustration, it will be assumed that "Container 1" referred to in FIGS. 2A1-2B2 corresponds to (i.e., is initiated from) the container image 26-1. The VM-based container runtime 32 launches the VMM 36 that is operable to initiate a VM (step 1004). In some implementations, the VMM 36 comprises QEMU. The container engine 31 provides location information that identifies the location of the container image 26-1 to the VM-based container runtime 32 via the CRI 34 (steps 1005, 1006). The VM-based container runtime sends the location information that identifies the location of the container image 26-1 to the block obtainer component 44 (step 1008). The VMM 36 initiates the VM 40 (step 1010).

The agent process 42 initiates in the VM 40. The agent process 42 determines the location of the decryption keys 28-1 (step 1012). In one implementation, the agent process 42 has a communication channel with the VM-based container runtime 32, such as via a VSOCK interface which the VMM 36 exposes to the guest OS in the VM 40 as a socket file. The VM-based container runtime 32 may communicate decryption key information to the agent process 42, such as the location of the decryption keys 28-1, that the agent process 42 utilizes to determine the location of the decryption keys 28-1. In other implementations, the agent process 42 is operable to interact with an attestation agent external to the VM 40 to determine that the VM 40 is not corrupted or otherwise differs from an expected state. For example, the key broker service 22 may include an attestation agent, and subsequent to initiation, the agent process 42 interacts with the attestation agent to determine that the VM 40 is not corrupted or does not otherwise differ from the expected state. In response to determining that the VM 40 is not corrupted, the key broker service 22 provides the decryption keys 28-1 to the agent process 42 (steps 1014, 1016).

The agent process 42 sets up the block remapper 46 and provides the decryption keys 28-1, or a reference to the decryption keys 28-1, to the block remapper 46 (step 1018). The agent process 42 sets up the block remapper 46 to receive a request from a file system and, in response, to determine a target block 58 of the request, and to request the block 58 from the block obtainer component 44 executing outside of the VM 40. The agent process 42 sets up the block remapper 46 to utilize the decryption keys 28-1 to decrypt encrypted blocks 58 received from the block obtainer component 44 to generate decrypted container image blocks 58 and to pass the decrypted container image blocks 58 to the file system 52. In some implementations, the block remapper comprises the Linux kernel device mapper. In some examples, the block remapper 46 includes a separate decryption component that is operable to decrypt the encrypted blocks 58 of the container image 26-1 using the decryption keys 28-1. In some implementations, the decryption component may comprise dm-crypt, which is a transparent block device encryption/decryption subsystem in the Linux kernel. The agent process 42 mounts, or causes the mounting of, the file system 52 and configures the file system 52 to utilize the block remapper 46 (step 1020).

The agent process 42 causes the container 54 (FIG. 1) to be initiated. This causes an access of the file system 52 to be made to obtain the container image 26-1 (step 1022). The file system 52 may maintain its own cache, and may access the cache to determine whether the requested block 58 is in the cache (step 1024). The file system 52 determines that the block 58 is not in the cache and communicates with the block remapper 46 to obtain the block 58 (step 1026). The block remapper 46 asks the block obtainer component 44 to fetch the block 58 (step 1028). The block obtainer component 44 accesses the cache 57 and determines that the block is not in the cache 57 (step 1030). The block obtainer component 44 then fetches the encrypted block 58 from the container image repository 24 (steps 1032, 1034). The block obtainer component 44 stores the encrypted block in the cache 57 (step 1036). The block obtainer component 44 sends the encrypted block to the block remapper 46 (step 1038). The block remapper 46 decrypts the encrypted block 58 and sends the decrypted container image block to the file system 52, which then provides the decrypted container image block to the requestor (steps 1040, 1042).

In some implementations, a tree of hashes can be derived based on the contents of the container image blocks 58 that can subsequently be used to validate the integrity of the container image blocks 58 as they are obtained from the block obtainer component 44 to ensure the container image blocks 58 have not been corrupted or tampered with. The agent process 42 obtains the tree of hashes, such as, by way of non-limiting example, from the key broker service 22, and provides the tree of hashes, or a reference to the tree of hashes, to the block remapper 46 during setup. The block remapper 46 then also validates the integrity of each container image block 58 using the tree of hashes prior to providing the container image block 58 to the file system 52, using, by way of non-limiting example, a dm-verity component of the Linux device mapper, or any other suitable integrity checking mechanism.

Figure 3:
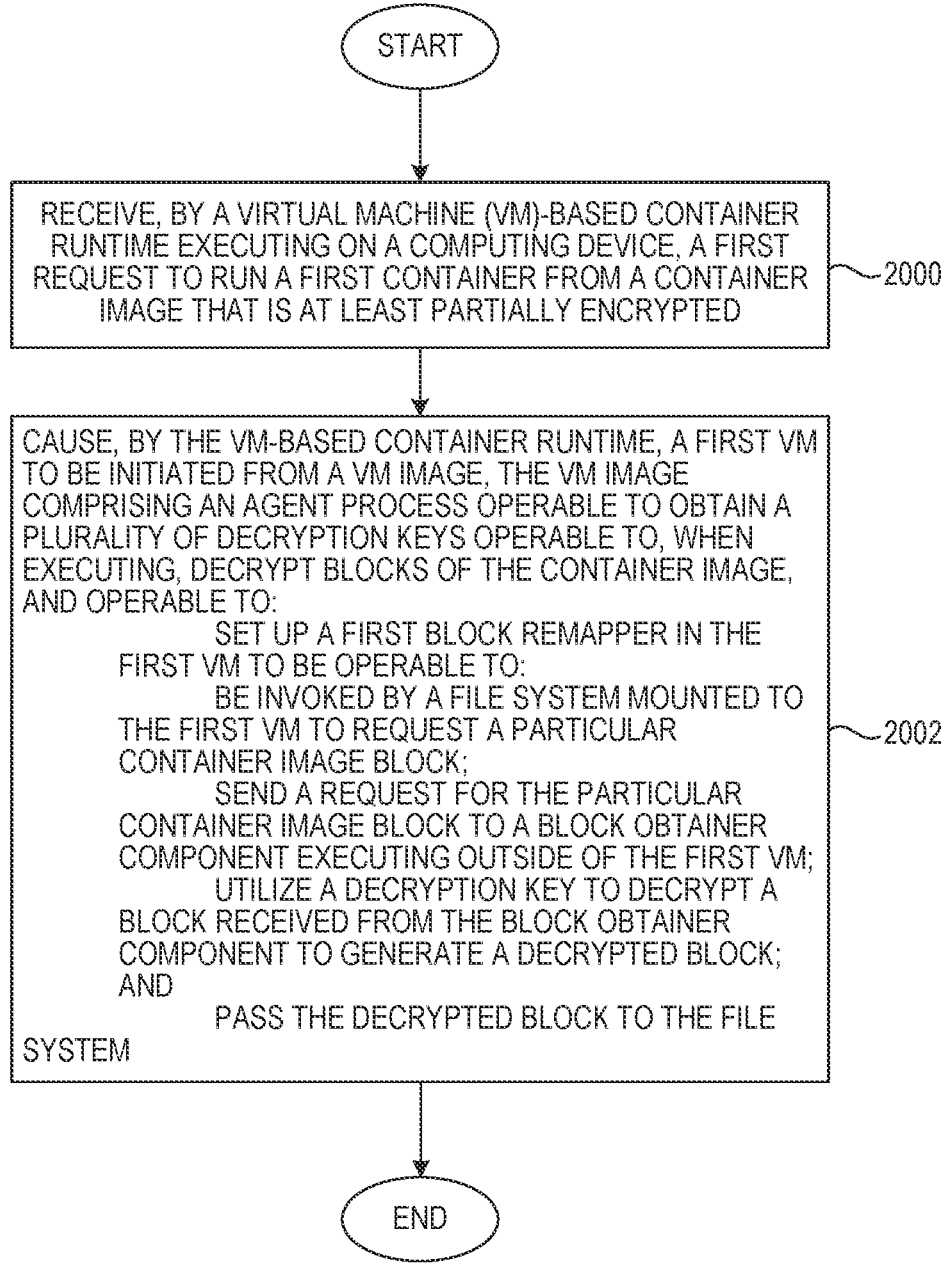
FIG. 3 is a flowchart illustrating on-demand encrypted container image download for VM-based containers according to one implementation.

FIG. 3 is a flowchart illustrating on-demand encrypted container image download for VM-based containers according to one implementation. FIG. 3 will be discussed in conjunction with FIG. 1. The VM-based container runtime 32 executing on the computing device 14 receives a request to run a container from the container image 26-1 that is at least partially encrypted (FIG. 3, block 2000). The VM-based container runtime 32 causes the VM 40 to be initiated from the VM image 38, the VM image 38 comprising the agent 39 operable to, during execution as the agent process 42, obtain the plurality of decryption keys 28-1 operable to decrypt blocks of the container image 26-1. The agent process 42 is also operable to set up the block remapper 46 in the VM 40 to be invoked by the file system 52 mounted to the VM 40 to request the container image block 58, request the container image block 58 from the block obtainer component 44 executing outside of the VM 40, utilize a decryption key to decrypt the block 58 received from the block obtainer component 44 to generate a decrypted container image block, and pass the decrypted container image block to the file system 52 (FIG. 3, block 2002).

Figure 4:
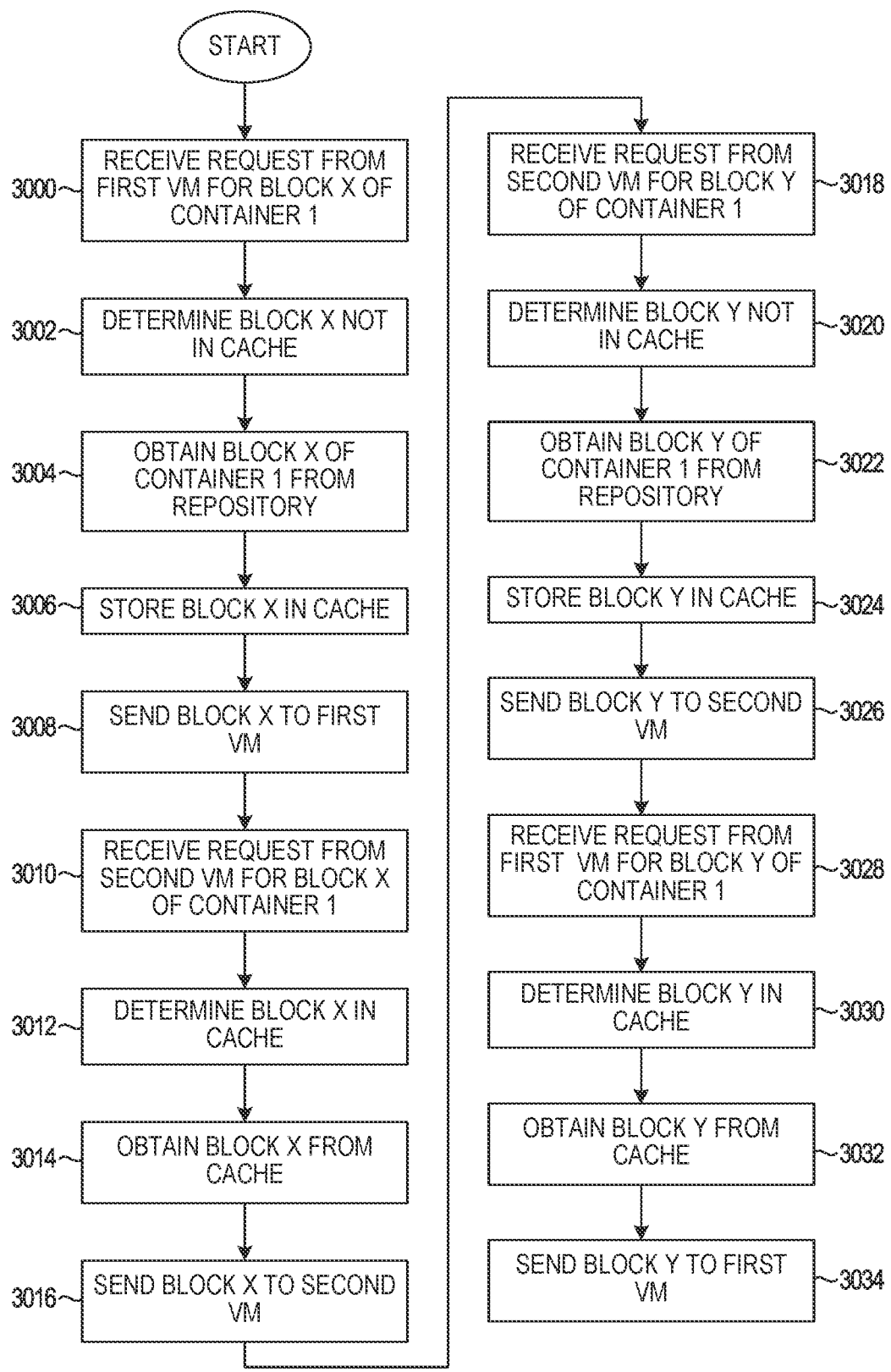
FIG. 4 is a flowchart illustrating a method for caching encrypted blocks in a file system that is external to a plurality of virtual machines and providing the encrypted blocks to the virtual machines according to one implementation.

FIG. 4 is a flowchart illustrating a method for caching encrypted blocks in a file system that is external to a plurality of virtual machines and for providing the encrypted blocks to the virtual machines according to one implementation. In this example, the block obtainer component 44 receives, from the VM 40, a request for a first block 58 (e.g., "block X") of the container image 26-1 (block 3000). In particular, the block obtainer component 44 may receive the request from the block remapper 46 executing in the VM 40. The block obtainer component 44 accesses the cache 57 and determines that the first block 58 is not in the cache 57 (block 3002). The block obtainer component 44 obtains the encrypted first block 58 from the container image repository 24 (block 3004). The block obtainer component 44 stores the encrypted first block 58 in the cache 57 (block 3006). The cache 57 is part of the file system of the host computing device 14. The block obtainer component 44 sends the encrypted first block 58 to the VM 40 (block 3008). The block obtainer component 44 receives, from the VM 40-1, a request for the encrypted first block 58 (e.g., "block X") of the container image 26-1 (block 3010). The block obtainer component 44 accesses the cache 57 and determines that the encrypted first block 58 is in the cache 57 (block 3012). The block obtainer component 44 obtains the encrypted first block 58 from the cache 57 (block 3014). The block obtainer component 44 sends the encrypted first block 58 to the VM 40-1 (block 3016).

The block obtainer component 44 receives from the VM 40-1 a request for a second block 58 (e.g., "block Y") of the container image 26-1 (block 3018). In particular, the block obtainer component 44 may receive the request from the block remapper 46-1 executing in the VM 40-1. The block obtainer component 44 accesses the cache 57 and determines that the second block 58 is not in the cache 57 (block 3020). The block obtainer component 44 obtains the encrypted second block 58 from the container image repository 24 (block 3022). The block obtainer component 44 stores the encrypted second block 58 in the cache 57 (block 3024). The block obtainer component 44 sends the encrypted second block 58 to the VM 40-1 (block 3026).

The block obtainer component 44 receives, from the VM 40, a request for the second block 58 (e.g., "block Y") of the container image 26-1 (block 3028). The block obtainer component 44 accesses the cache 57 and determines that the encrypted second block 58 is in the cache 57 (block 3030). The block obtainer component 44 obtains the encrypted second block 58 from the cache 57 (block 3032). The block obtainer component 44 sends the encrypted second block 58 to the VM 40 (block 3034).

Figure 5:
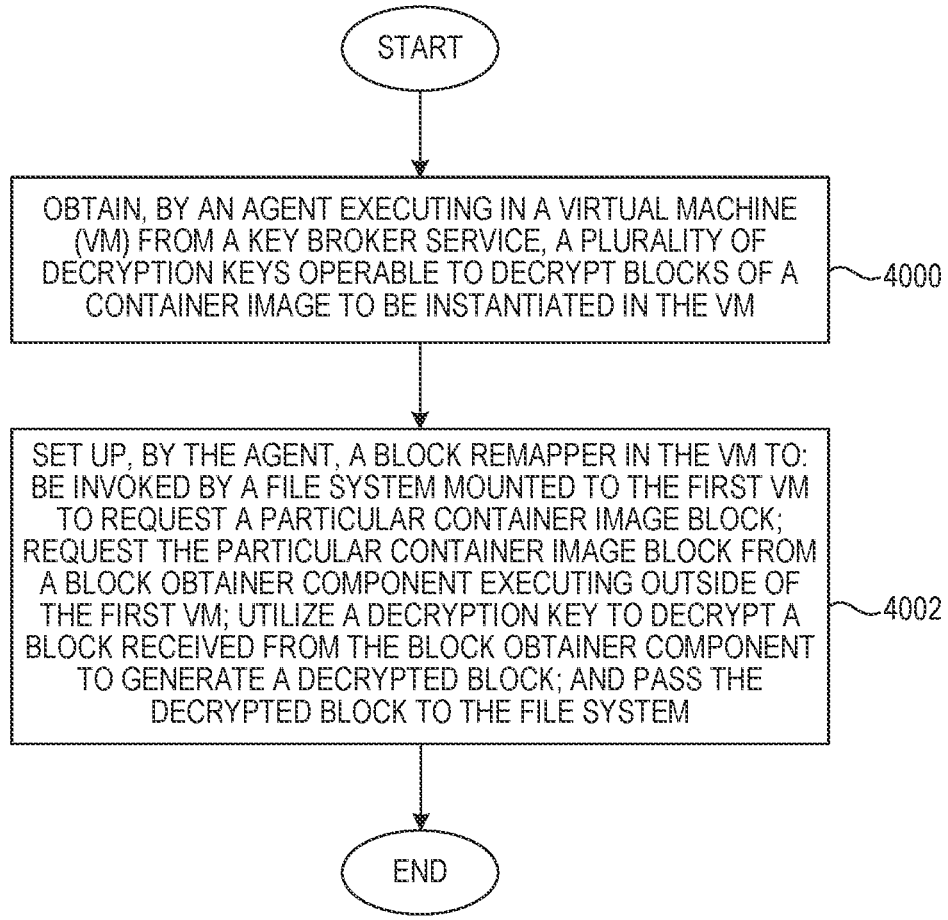
FIG. 5 is a flowchart of a method of an agent process executing in a VM setting up a block remapper to facilitate obtaining encrypted blocks from a block obtainer component when requested by a file system according to one implementation.

FIG. 5 is a flowchart of a method of an agent process executing in a VM setting up a block remapper to facilitate obtaining encrypted blocks from a block obtainer component when requested by a file system according to one implementation. In this example, the agent process 42, executing in the VM 40, obtains, from the key broker service 22, the decryption keys 28-1 operable to decrypt the blocks 58 of the container imager 26-1 (block 4000). The agent process 42 sets up the block remapper 46 in the VM 40 to be invoked by the file system 52 mounted to the VM 40 to request a particular container image block 58, request the particular container image block 58 from the block obtainer component 44 executing outside of the VM 40, utilize a decryption key 28-1 to decrypt the block 58 received from the block obtainer component 44 to generate a decrypted container image block 58, and pass the decrypted container image block 58 to the file system 52 (block 4002).

Figure 6:
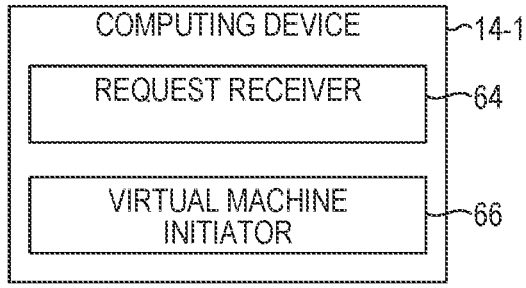
FIG. 6 is a block diagram of a computing device suitable for implementing on-demand encrypted container image download for VM-based containers according to another implementation.

FIG. 6 is a block diagram of a computing device 14-1 according to another implementation. The computing device 14-1 implements identical functionality as that described above with regard to the computing device 14. The computing device 14-1 includes a request receiver 64 to receive, by a VM-based container runtime, a request to run a container from a container image that is at least partially encrypted.

The request receiver 64 may comprise executable software instructions configured to program a processor device to implement the functionality of receiving, by a VM-based container runtime, a request to run a container from a container image that is at least partially encrypted, may comprise circuitry including, by way of non-limiting example, an application-specific integrated circuit (ASIC), field-programmable gate array (FPGA), or may comprise a combination of executable software instructions and circuitry.

The computing device 14-1 also includes a VM initiator 66 to cause a VM to be initiated from a VM image, the VM image including an agent operable to, when executing, obtain a plurality of decryption keys operable to decrypt blocks of the container image, and operable to set up a block remapper in the VM to be invoked by a file system mounted to the VM to request a particular container image block; request the particular container image block from a block obtainer component executing outside of the VM; utilize a decryption key to decrypt a container image block received from the block obtainer component to generate a decrypted container image block; and pass the decrypted container image block to the file system. The VM initiator 66 may comprise executable software instructions to program a processor device to implement the functionality of causing a VM to be initiated from a VM image, the VM image including an agent operable to, when executing, obtain a plurality of decryption keys operable to decrypt blocks of the container image, and operable to set up a block remapper in the VM to be invoked by a file system mounted to the VM to request a particular container image block; request the particular container image block from a block obtainer component executing outside of the VM; utilize a decryption key to decrypt a container image block received from the block obtainer component to generate a decrypted container image block; and pass the decrypted container image block to the file system, may comprise circuitry including, by way of non-limiting example, an ASIC, FPGA, or may comprise a combination of executable software instructions and circuitry.

Figure 7:
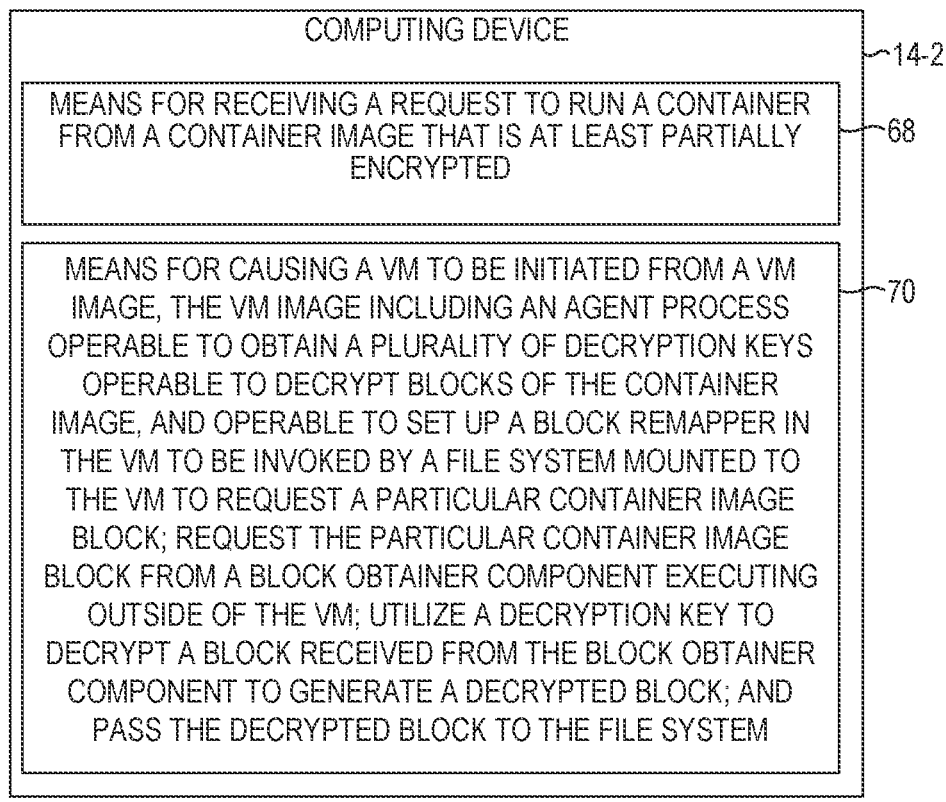
FIG. 7 is a block diagram of a computing device suitable for implementing on-demand encrypted container image download for VM-based containers according to another implementation.

FIG. 7 is a block diagram of a computing device 14-2 according to additional implementations. The computing device 14-2 implements identical functionality as that described above with regard to the computing device 14. In this implementation, the computing device 14-2 includes a means 68 for receiving a request to run a container from a container image that is at least partially encrypted. The means 68 may be implemented in any number of manners, including, for example, via the request receiver 64 illustrated in FIG. 6.

The computing device 14-2 also includes a means 70 for causing a VM to be initiated from a VM image, the VM image including an agent operable to, when executing, obtain a plurality of decryption keys operable to decrypt blocks of the container image, and operable to set up a block remapper in the VM to be invoked by a file system mounted to the VM to request a particular container image block; request the particular container image block from a block obtainer component executing outside of the VM; utilize a decryption key to decrypt a container image block received from the block obtainer component to generate a decrypted container image block; and pass the decrypted container image block to the file system. The means 70 may be implemented in any number of manners, including, for example, via the VM initiator 66 illustrated in FIG. 6.

Figure 8:
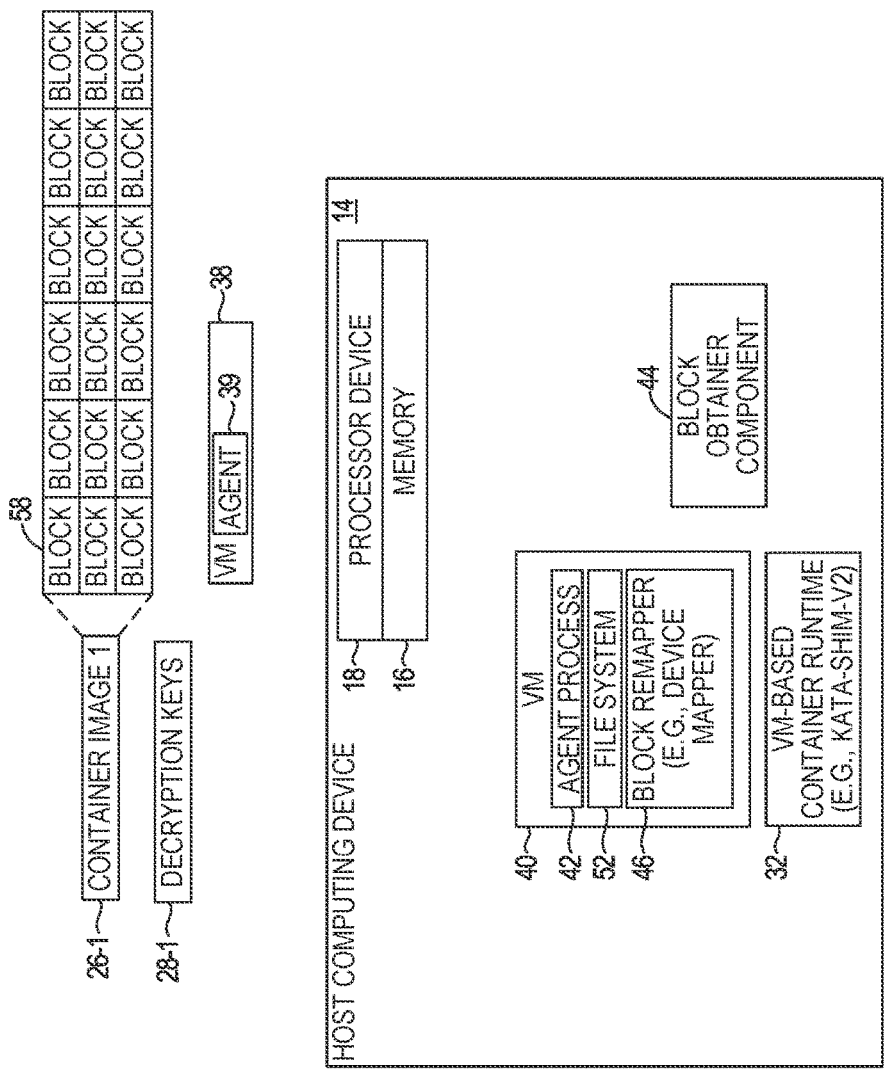
FIG. 8 is a simplified block diagram of the environment illustrated in FIG. 1 according to one implementation.

FIG. 8 is a simplified block diagram of the environment 10 illustrated in FIG. 1 according to one implementation. The environment 10 includes the computing device 14, the memory 16, and the processor device 18 coupled to the memory 16. The processor device 18 is to receive, by the VM-based container runtime 32, a request to run a container from the container image 26-1 that is at least partially encrypted. The processor device 18 is further to cause, by the VM-based container runtime 32, the VM 40 to be initiated from the VM image 38, the VM image 38 including the agent 39 operable to, when executing, obtain the plurality of decryption keys operable to decrypt blocks of the container image, and operable to set up the block remapper 46 in the VM 40 to be invoked by the file system 52 mounted to the VM 40 to request a particular container image block 58, request the particular container image block 58 from the block obtainer component 44 executing outside of the VM 40, utilize a decryption key to decrypt the block 58 received from the block obtainer component 44 to generate a decrypted container image block, pass the decrypted container image block 58 to the file system 52, and send, by the VM-based container runtime 32 to the block obtainer component 44, location information that identifies a location of the container image 26-1.

Figure 9:
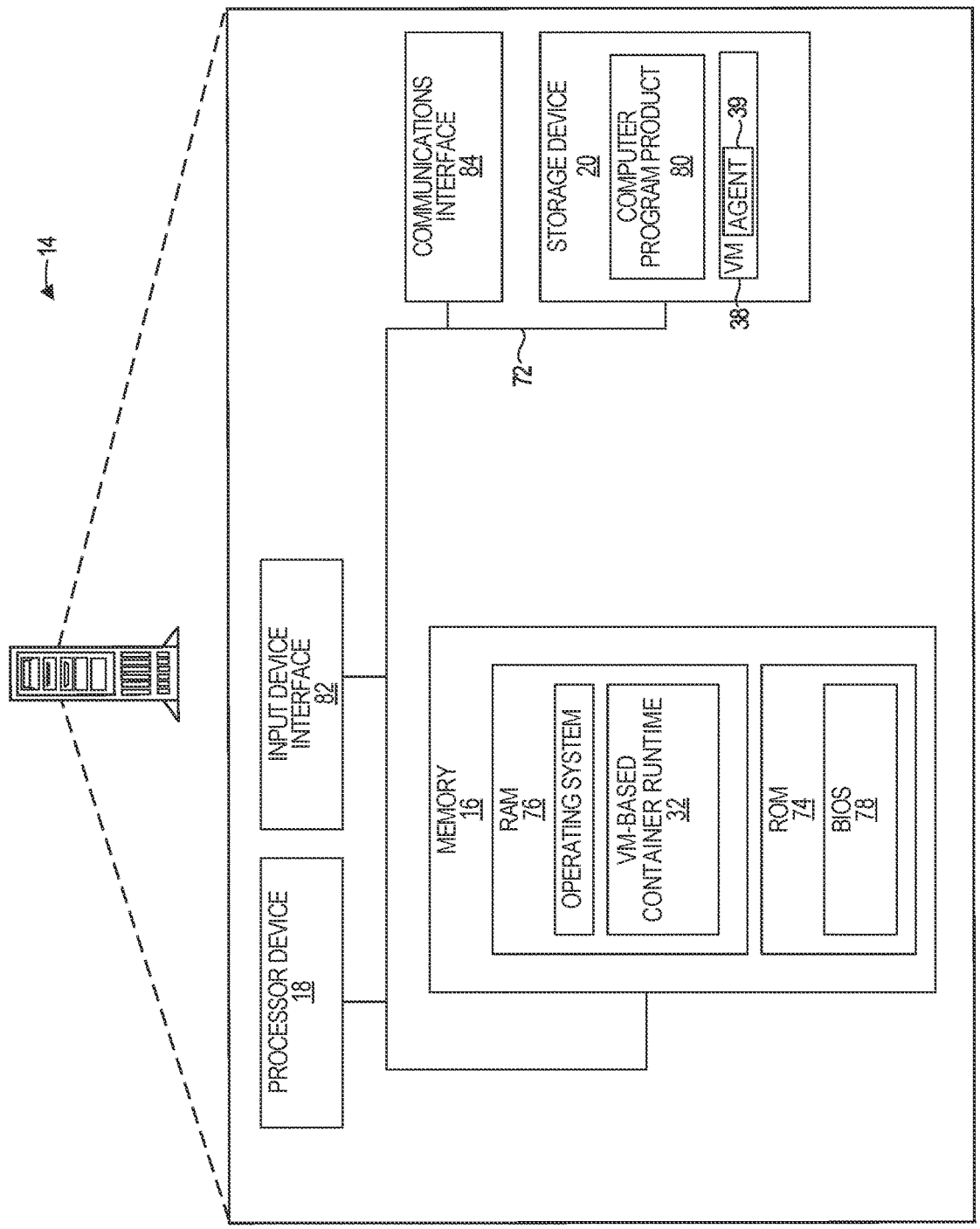
FIG. 9 is a block diagram of a computing device suitable for on-demand encrypted container image download for VM-based containers according to another implementation.

FIG. 9 is a block diagram of a computing device suitable for on-demand encrypted container image download for VM-based containers according to one implementation. The computing device 14 may comprise any computing or electronic device capable of including firmware, hardware, and/or executing software instructions to implement the functionality described herein, such as a computer server or the like. The computing device 14 includes the processor device 18, the system memory 16, and a system bus 72. The system bus 72 provides an interface for system components including, but not limited to, the system memory 16 and the processor device 18. The processor device 18 can be any commercially available or proprietary processor.

The system bus 72 may be any of several types of bus structures that may further interconnect to a memory bus (with or without a memory controller), a peripheral bus, and/or a local bus using any of a variety of commercially available bus architectures. The system memory 16 may include non-volatile memory 74 (e.g., read-only memory (ROM), erasable programmable read-only memory (EPROM), electrically erasable programmable read-only memory (EEPROM), etc.), and volatile memory 76 (e.g., random-access memory (RAM)). A basic input/output system (BIOS) 78 may be stored in the non-volatile memory 74 and can include the basic routines that help to transfer information between elements within the computing device 14. The volatile memory 76 may also include a high-speed RAM, such as static RAM, for caching data.

The computing device 14 may further include or be coupled to a non-transitory computer-readable storage medium such as the storage device 20, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 20 and other drives associated with computer-readable media and computer-usable media may provide non-volatile storage of data, data structures, computer-executable instructions, and the like.

A number of modules can be stored in the storage device 20 and in the volatile memory 76, including an operating system and one or more program modules, such as the VM-based container runtime 32, which may implement the functionality described herein in whole or in part. All or a portion of the examples may be implemented as a computer program product 80 stored on a transitory or non-transitory computer-usable or computer-readable storage medium, such as the storage device 20, which includes complex programming instructions, such as complex computer-readable program code, to cause the processor device 18 to carry out the steps described herein. Thus, the computer-readable program code can comprise software instructions for implementing the functionality of the examples described herein when executed on the processor device 18. The processor device 18, in conjunction with the VM-based container runtime 32 in the volatile memory 76, may serve as a controller, or control system, for the computing device 14 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 18 through an input device interface 82 that is coupled to the system bus 72 but can be connected by other interfaces such as a parallel port, an Institute of Electrical and Electronic Engineers (IEEE) 1394 serial port, a Universal Serial Bus (USB) port, an IR interface, and the like. The computing device 14 may also include a communications interface 84 suitable for communicating with a network as appropriate or desired.

Figure 10:
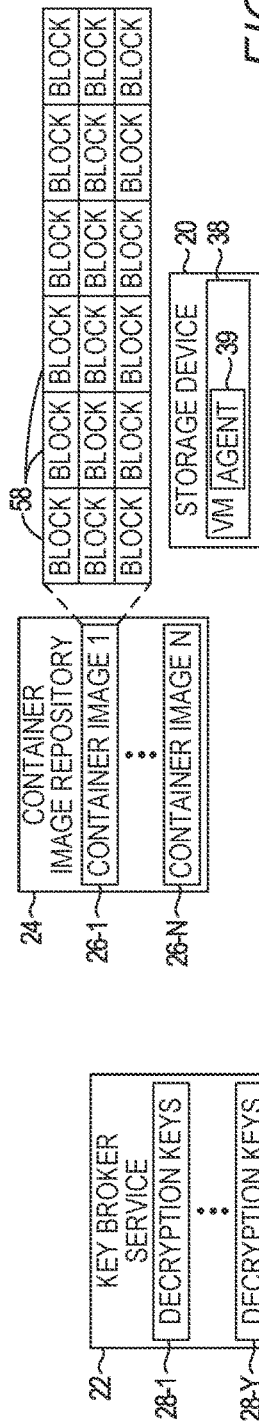
FIG. 10 is a block diagram of an environment in which on-demand encrypted container image download for VM-based containers can be practiced according to another implementations.
Figure 10:
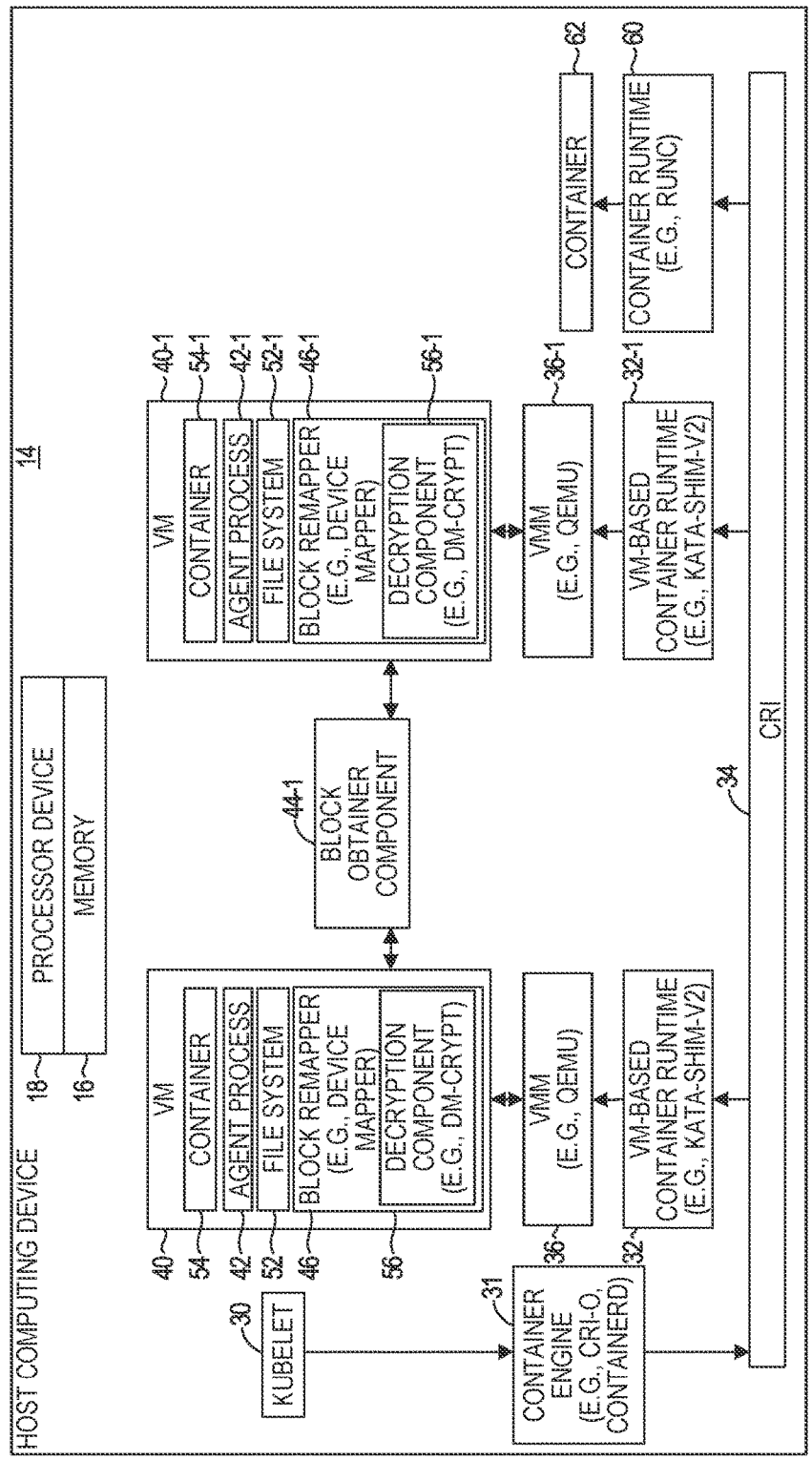

FIG. 10 is a block diagram of an environment 10-1 in which on-demand encrypted container image download for VM-based containers can be practiced according to another implementation. The environment 10-1 is substantially identical to the environment 10, and the components illustrated in the environment 10-1 operate the same as described above with regard to FIG. 1 unless explicitly stated otherwise below. In this example, a block obtainer component 44-1 operates substantially the same as discussed above with regard to the block obtainer component 44, except the block obtainer component 44-1 does not cache container image blocks 58, and thus the block obtainer component 44-1 accesses the container image repository 24 for each request of a container image block 58 from either the block remapper 46 or the block remapper 46-1.

Other computer system designs and configurations may also be suitable to implement the systems and methods described herein. The following examples illustrate various additional implementations in accordance with one or more aspects of the disclosure.

Example 1 is a computing device that includes: a request receiver to receive, by a virtual machine (VM)-based container runtime, a request to run a container from a container image that is at least partially encrypted; and a VM initiator to cause a VM to be initiated from a VM image, the VM image including an agent operable to, when executing, obtain a plurality of decryption keys operable to decrypt blocks of the container image, and operable to set up a block remapper in the VM to be invoked by a file system mounted to the VM to request a particular container image block; request the particular container image block from a block obtainer component executing outside of the VM; utilize a decryption key to decrypt a container image block received from the block obtainer component to generate a decrypted container image block; and pass the decrypted container image block to the file system.

Example 2 is a computing device that includes: means for receiving a request to run a container from a container image that is at least partially encrypted; and means for causing a VM to be initiated from a VM image, the VM image including an agent operable to, when executing, obtain a plurality of decryption keys operable to decrypt blocks of the container image, and operable to set up a block remapper in the VM to be invoked by a file system mounted to the VM to request a particular container image block; request the particular container image block from a block obtainer component executing outside of the VM; utilize a decryption key to decrypt a container image block received from the block obtainer component to generate a decrypted container image block; and pass the decrypted container image block to the file system.

Example 3 is a method that includes: receiving, by a block obtainer component executing on a computing device, location information that identifies a location of a container image that is at least partially encrypted; receiving, by the block obtainer component from a first virtual machine (VM) executing on the computing device, the block obtainer component being external to the first VM, a request for a first encrypted block of the container image; obtaining, by the block obtainer component, the first encrypted block; storing, by the block obtainer component, the first encrypted block in a cache; and sending, by the block obtainer component to the first VM, the first encrypted block.

Example 4 is the method of example 3 wherein obtaining the first encrypted block includes obtaining the first encrypted block from a container image repository that is communicatively coupled to the computing device, the container image repository including a plurality of container images including the container image.

Example 5 is the method of example 3 further including: prior to obtaining the first encrypted block, accessing, by the block obtainer component, a cache maintained by the block obtainer component to determine whether the first encrypted block is in the cache; and determining, by the block obtainer component, that the first encrypted block is not in the cache.

Example 6 is the method of example 3 wherein the cache is maintained in a boot file system of the computing device from which the computing device boots that is separate from a file system of the first VM.

Example 7 is the method of example 3 wherein the block obtainer component lacks an ability to decrypt the first encrypted block.

Example 8 is the method of example 3 wherein the block obtainer component receives the request for the first encrypted block of the container image from a block remapper of the first VM.

Example 9 is the method of example 3 further including: receiving, by the block obtainer component from a second VM executing on the computing device, the block obtainer component being external to the second VM, a request for the first encrypted block of the container image; obtaining, by the block obtainer component, the first encrypted block from the cache; and sending, by the block obtainer component to the second VM, the first encrypted block.

Example 10 is the method of example 9 further including: receiving, by the block obtainer component from the second VM, a request for a second encrypted block of the container image; obtaining, by the block obtainer component, the first encrypted block from a container image repository that is communicatively coupled to the computing device, the container image repository including a plurality of container images including the container image; storing, by the block obtainer component, the second encrypted block in the cache; and sending, by the block obtainer component to the second VM, the second encrypted block.

Example 11 is the method of example 10 further including: receiving, by the block obtainer component from the first VM a request for the second encrypted block of the container image; obtaining, by the block obtainer component, the second encrypted block from the cache; and sending, by the block obtainer component to the first VM, the first encrypted block.

Example 12 is a computing device, including: a memory; and a processor device coupled to the memory to: receive, by a block obtainer component executing on a computing device, location information that identifies a location of a container image that is at least partially encrypted; receive, by the block obtainer component from a first virtual machine (VM) executing on the computing device, the block obtainer component being external to the first VM, a request for a first encrypted block of the container image; obtain, by the block obtainer component, the first encrypted block; store, by the block obtainer component, the first encrypted block in a cache; and send, by the block obtainer component to the first VM, the first encrypted block.

Example 13 is the computing device of example 12 wherein the processor device is further to: prior to obtaining the first encrypted block, access, by the block obtainer component, a cache maintained by block obtainer component to determine whether the first encrypted block is in the cache; and determine, by the block obtainer component, that the first encrypted block is not in the cache.

Example 14 is the computing device of example 12 wherein the cache is maintained in a boot file system of the computing device from which the computing device boots that is separate from a file system of the first VM.

Example 15 is the computing device of example 12 wherein the processor device is further to: receive, by the block obtainer component from a second VM executing on the computing device, the block obtainer component being external to the second VM, a request for the first encrypted block of the container image; obtain, by the block obtainer component, the first encrypted block from the cache; and send, by the block obtainer component to the second VM, the first encrypted block.

Example 16 is a method including obtaining, by an agent executing in a virtual machine (VM), a plurality of decryption keys operable to decrypt blocks of a container image to be instantiated in the VM; setting up, by the agent, a block remapper in the VM to: be invoked by a file system mounted to the first VM to request a particular container image block; request the particular container image block from a block obtainer component executing outside of the first VM; utilize a decryption key to decrypt a container image block received from the block obtainer component to generate a decrypted container image block; and pass the decrypted container image block to the file system.

Example 17 is the method of example 16 further including obtaining, by the agent, the plurality of decryption keys from a key broker service.

Example 18 is the method of example 16 further including receiving, by the agent from a VM-based container runtime executing outside of the VM, decryption key information that identifies a source of the plurality of decryption keys.

Example 19 is a computing device, including a memory and a processor device coupled to the memory to: obtain, by an agent executing in a virtual machine (VM), a plurality of decryption keys operable to decrypt blocks of a container image to be instantiated in the VM; set up, by the agent, a block remapper in the VM to: be invoked by a file system mounted to the first VM to request a particular container image block; request the particular container image block from a block obtainer component executing outside of the first VM; utilize a decryption key to decrypt a container image block received from the block obtainer component to generate a decrypted container image block; and pass the decrypted container image block to the file system.

Example 20 is the computing device of example 19 wherein the processor device is further to receive, by the agent from a VM-based container runtime executing outside of the VM, decryption key information that identifies a source of the plurality of decryption keys.

Individuals will recognize improvements and modifications to the preferred examples of the disclosure. All such improvements and modifications are considered within the scope of the concepts disclosed herein and the claims that follow.

What is claimed is:

1. A method comprising:
receiving, by a virtual machine (VM)-based container runtime executing on a computing device, a first request to run a first container from a container image that is at least partially encrypted;
causing, by the VM-based container runtime, a first VM to be initiated from a VM image, the VM image comprising an agent operable to, during execution, obtain a plurality of decryption keys operable to decrypt blocks of the container image, and operable to:
set up a first block remapper in the first VM to be operable to:
be invoked by a file system mounted to the first VM to request a particular container image block;
send a request for the particular container image block to a block obtainer component executing outside of the first VM;
utilize a decryption key to decrypt a container image block received from the block obtainer component to generate a decrypted container image block; and
pass the decrypted container image block to the file system.

2. The method of claim 1 further comprising:
sending, by the VM-based container runtime to the block obtainer component, container image location information that identifies a location of the container image.

3. The method of claim 1 wherein to obtain the plurality of decryption keys, the agent is operable to obtain the plurality of decryption keys from a key broker service that is external to the computing device.

4. The method of claim 3 wherein the agent is operable to interact with an attestation agent external to the first VM to determine that the first VM is not corrupted and, in response to determining that the first VM is not corrupted, obtain the plurality of decryption keys from the key broker service.

5. The method of claim 1 wherein causing the first VM to be initiated from the VM image further comprises:
initiating, by the VM-based container runtime, a virtual machine monitor (VMM) that is operable to initiate the first VM.

6. The method of claim 5 wherein the VMM comprises QEMU.

7. The method of claim 1 further comprising:
prior to receiving the request to run the first container from the container image, generating the container image, the container image comprising a plurality of layers;
causing blocks of each layer of the plurality of layers to be encrypted with corresponding ones of a plurality of encryption keys; and
storing, in a key broker service, a plurality of decryption keys operable to decrypt ones of the blocks.

8. The method of claim 1 wherein the first block remapper comprises a Linux kernel device mapper.

9. The method of claim 8 wherein the Linux kernel device mapper utilizes dm-crypt to decrypt the container image block received from the block obtainer component.

10. The method of claim 1 wherein the VM-based container runtime causes decryption key information to be passed to the agent, and wherein the agent is operable to use the decryption key information to obtain the plurality of decryption keys.

11. The method of claim 1 further comprising:
receiving, by the VM-based container runtime, a request to run a second container from the container image;
causing, by the VM-based container runtime, a second VM to be initiated from the VM image, the VM image comprising the agent operable to obtain the plurality of decryption keys operable to decrypt the blocks of the container image, and operable to:
set up a second block remapper in the second VM to be operable to:
be invoked by a file system mounted to the second VM to request a particular container image block;
send a request for the particular container image block to the block obtainer component executing outside of the second VM;
utilize a decryption key to decrypt a container image block received from the block obtainer component to generate a decrypted container image block; and
pass the decrypted container image block to the file system; and sending, by the VM-based container runtime to the block obtainer component, location information that identifies a location of the container image.

12. The method of claim 11 further comprising:
receiving, by the block obtainer component, a request from the first block remapper in the first VM for a first container image block;
determining, by the block obtainer component, that the first container image block was not in a cache of the block obtainer component;
requesting, by the block obtainer component, from a container image repository, the first container image block;
sending, by the block obtainer component to the first block remapper in the first VM, the first container image block;
receiving, by the block obtainer component, a request from the second block remapper in the second VM for the first container image block;
determining, by the block obtainer component, that the first container image block is in the cache of the block obtainer component;
obtaining, by the block obtainer component from the cache, the first container image block; and
sending, by the block obtainer component to the second block remapper in the second VM, the first particular container image block.

13. The method of claim 1 wherein the agent is further operable to, during execution, obtain a tree of hashes derived based on contents of the blocks of the container image, and operable to set up the first block remapper in the first VM to:
validate the integrity of the particular container image block using the tree of hashes prior to providing the particular container image block to the file system.

14. A computing device, comprising:
a memory; and
a processor device coupled to the memory to:
receive, by a virtual machine (VM)-based container runtime, a first request to run a first container from a container image that is at least partially encrypted;
cause, by the VM-based container runtime, a first VM to be initiated from a VM image, the VM image comprising an agent operable to, during execution, obtain a plurality of decryption keys operable to decrypt blocks of the container image, and operable to:
set up a first block remapper in the first VM to be operable to:
be invoked by a file system mounted to the first VM to request a particular container image block;
send a request for the particular container image block to a block obtainer component executing outside of the first VM;
utilize a decryption key to decrypt a container image block received from the block obtainer component to generate a decrypted container image block; and
pass the decrypted container image block to the file system; and
send, by the VM-based container runtime to the block obtainer component, container image location information that identifies a location of the container image.

15. The computing device of claim 14 wherein the agent is operable to interact with an attestation agent external to the first VM to determine that the first VM is not corrupted and, in response to determining that the first VM is not corrupted, obtain the plurality of decryption keys from the key broker service.

16. The computing device of claim 14 wherein to cause the first VM to be initiated from the VM image, the VM-based container runtime is further operable to initiate a virtual machine monitor (VMM) that is operable to initiate the first VM.

17. The computing device of claim 14 wherein the first block remapper comprises a Linux kernel device mapper.

18. The computing device of claim 14 wherein the processor device is further to:
receive, by the VM-based container runtime, a request to run a second container from the container image;
cause, by the VM-based container runtime, a second VM to be initiated from the VM image, the VM image comprising the agent operable to obtain the plurality of decryption keys operable to decrypt the blocks of the container image, and operable to:
set up a second block remapper in the second VM to be operable to:
be invoked by a file system mounted to the second VM to request a particular container image block;
send a request for the particular container image block to the block obtainer component executing outside of the second VM;
utilize a decryption key to decrypt a container image block received from the block obtainer component to generate a decrypted container image block; and
pass the decrypted container image block to the file system; and
send, by the VM-based container runtime to the block obtainer component, location information that identifies the location of the container image.

19. A non-transitory computer-readable storage medium that includes executable instructions to cause a processor device to:
receive, by a virtual machine (VM)-based container runtime, a first request to run a first container from a container image that is at least partially encrypted;
cause, by the VM-based container runtime, a first VM to be initiated from a VM image, the VM image comprising an agent operable to, during execution, obtain a plurality of decryption keys operable to decrypt blocks of the container image, and operable to:
set up a first block remapper in the first VM to be operable to:
be invoked by a file system mounted to the first VM to request a particular container image block;
send a request for the particular container image block to a block obtainer component executing outside of the first VM;
utilize a decryption key to decrypt a container image block received from the block obtainer component to generate a decrypted container image block; and
pass the decrypted container image block to the file system.

20. The non-transitory computer-readable storage medium of claim 19 wherein the agent is operable to interact with an attestation agent external to the first VM to determine that the first VM is not corrupted and, in response to determining that the first VM is not corrupted, obtain the plurality of decryption keys from the key broker service.

* * * * *